US012475841B2

(12) United States Patent
Kim et al.

(10) Patent No.: US 12,475,841 B2
(45) Date of Patent: Nov. 18, 2025

(54) DISPLAY APPARATUS AND DRIVING METHOD THEREOF

(71) Applicant: LG Display Co., Ltd., Seoul (KR)

(72) Inventors: Min Hoi Kim, Paju-si (KR); Tae Gung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/514,342

(22) Filed: Nov. 20, 2023

(65) Prior Publication Data

US 2024/0203333 A1 Jun. 20, 2024

(30) Foreign Application Priority Data

Dec. 16, 2022 (KR) ........................ 10-2022-0177236

(51) Int. Cl.
*G09G 3/3208* (2016.01)

(52) U.S. Cl.
CPC ... *G09G 3/3208* (2013.01); *G09G 2300/0426* (2013.01); *G09G 2310/0286* (2013.01); *G09G 2310/08* (2013.01)

(58) Field of Classification Search
CPC ......... G09G 3/3266; G09G 2310/0286; G09G 2310/067
See application file for complete search history.

(56) References Cited

U.S. PATENT DOCUMENTS 8,957,883 B2 2/2015 Maruyama et al.
9,747,854 B2 8/2017 Li et al.
10,049,628 B2 8/2018 Kim et al.
11,004,374 B2 5/2021 Kurokawa et al.
11,651,740 B2 5/2023 Kim et al.
11,837,133 B2 12/2023 Liu et al.
2004/0257388 A1 12/2004 Tobita
2011/0032231 A1 2/2011 Maruyama et al.
2016/0124491 A1* 5/2016 An ........................ G06F 1/3265 713/323
2016/0155405 A1 6/2016 Kim et al.
2016/0171933 A1* 6/2016 Takahara ............. G09G 3/3233 345/212

(Continued)

FOREIGN PATENT DOCUMENTS

CN 104966506 A 10/2015
CN 109036246 A 12/2018

(Continued)

OTHER PUBLICATIONS

Intellectual Property Office of the United Kingdom, Combined Search and Examination Report, United Kingdom Patent Application No. GB2319213.1, Jun. 6, 2024, seven pages.

(Continued)

*Primary Examiner* — Kevin M Nguyen
(74) *Attorney, Agent, or Firm* — Fenwick & West LLP

(57) ABSTRACT

A display apparatus includes a display panel configured to display an image, a gate driver configured to supply gate signals to the display panel, a data driver connected with the display panel, and a timing controller configured to control the gate driver, wherein the timing controller controls an output type of the gate driver so that one gate signal of the gate signals is applied per one gate line or per at least two gate lines, based on an image applied from an external device.

4 Claims, 16 Drawing Sheets

(56) References Cited

U.S. PATENT DOCUMENTS

| | | | | |
|---|---|---|---|---|
| 2017/0025068 | A1* | 1/2017 | Jeoung | G09G 3/3266 |
| 2017/0178581 | A1 | 6/2017 | Li et al. | |
| 2019/0005884 | A1* | 1/2019 | Yoo | G09G 3/3266 |
| 2019/0228712 | A1* | 7/2019 | Li | G09G 3/3266 |
| 2020/0105176 | A1 | 4/2020 | Kurokawa et al. | |
| 2022/0208106 | A1 | 6/2022 | Kim et al. | |
| 2023/0129625 | A1 | 4/2023 | Liu et al. | |
| 2024/0105091 | A1 | 3/2024 | Liu et al. | |

FOREIGN PATENT DOCUMENTS

| | | | |
|---|---|---|---|
| CN | 109188806 | A | 1/2019 |
| JP | 2005-010282 | A | 1/2005 |
| JP | 2011-039081 | A | 2/2011 |
| JP | 2022-105277 | A | 7/2022 |
| KR | 10-2017-0066773 | A | 6/2017 |
| TW | I693583 | B | 5/2020 |
| WO | WO 2018/197985 | A1 | 11/2018 |
| WO | WO 2022/160160 | A1 | 8/2022 |

OTHER PUBLICATIONS

Taiwan Intellectual Property Office, Office Action, Taiwanese Patent Application No. 112148913, Oct. 9, 2024, eight pages.
The Japan Patent Office, Office Action, Japanese Patent Application No. 2023-198739, Oct. 24, 2024, 13 pages.

* cited by examiner

DISPLAY APPARATUS AND DRIVING METHOD THEREOF

CROSS-REFERENCE TO RELATED APPLICATION

This application claims the benefit of the Republic of Korea Patent Application No. 10-2022-0177236 filed on Dec. 16, 2022, which is hereby incorporated by reference in its entirety.

BACKGROUND

Field

The present disclosure relates to a display apparatus and a driving method thereof.

Discussion of the Related Art

As information technology advances, the market for display apparatuses which are connection mediums connecting a user with information is increasing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

SUMMARY

To overcome the aforementioned problem of the related art, the present disclosure may provide a display apparatus which may change a driving mode of a display panel on the basis of a resolution or a driving frequency of an image applied to the display apparatus and where platforms of circuits may be integrated in implementing an apparatus for increasing or decreasing a driving scan rate, thereby increasing general purpose. Also, the present disclosure may provide a general-purpose change circuit for changing a driving scan rate in a method requiring the sensing and compensation of a display panel or a method having no requirement.

To achieve these objects and other advantages and in accordance with the purpose of the disclosure, as embodied and broadly described herein, a display apparatus includes a display panel configured to display an image, a gate driver configured to supply gate signals to the display panel, a data driver connected with the display panel, and a timing controller configured to control the gate driver, wherein the timing controller controls an output type of the gate driver so that one gate signal of the gate signals is applied per one gate line or per at least two gate lines, based on an image applied from an external device.

The gate driver may include a shift register configured to output the gate signals, a level shifter configured to output scan clock signals for driving the shift register, and an output change circuit configured to be activated or deactivated based on control by the timing controller to control an output of the shift register or the level shifter.

The output change circuit may be activated or deactivated based on control by the timing controller to control the gate signals output from the shift register or control the scan clock signals output from the level shifter.

The timing controller may generate an output change signal for controlling an output type of the gate driver, based on at least one of resolution information and frequency information in the image applied from the external device.

When a resolution is changed by the image applied from the external device, the output change signal may be generated as high logic, based on an active period where an image is displayed, and the output change signal may be generated as low logic, based on a blank period where an image is not displayed.

When the output change signal is generated as low logic based on a blank period where an image is not displayed, the data driver may sense the display panel through a sensing line and may prepare a sensing value.

The display panel may include a resolution change period for operating an apparatus under a changed driving condition when a resolution is changed by the image applied from the external device, and the gate signals may be not output during the resolution change period.

The output change circuit may include a first-type transistor including a gate electrode connected with an output change signal line through which the output change signal is transferred, a first electrode connected with a first output terminal of the shift register included in the gate driver and a first gate line, and a second electrode connected with a second output terminal of the shift register and a second gate line and a second-type transistor including a gate electrode connected with the output change signal line, a first electrode connected with the second output terminal of the shift register, and a second electrode connected with the second gate line, and the first type may differ from the second type.

In another aspect of the present disclosure, a driving method of a display apparatus includes detecting resolution information in an image applied from an external device, generating an output change signal when a resolution is changed by the image applied from the external device, generating an output change signal having a first logic based on an active period where an image is displayed, and generating an output change signal having a second logic differing from the first logic, based on a blank period where an image is not displayed, and performing control so that one gate signal is applied per one gate line based on the output change signal having the first logic and one gate signal is applied per two gate lines based on the output change signal having the second logic.

When the resolution is changed from a high resolution to a low resolution, the output change signal may be generated as the first logic.

When the output change signal is generated as the second logic, sensing the display panel to prepare a sensing value.

When a resolution is changed by the image applied from the external device, the display panel includes a resolution change period for operating an apparatus under a changed driving condition, and the gate signals are not output during the resolution change period.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, for convenience of description, a light emitting display apparatus self-emitting light on the basis of an inorganic light emitting diode or an organic light emitting diode will be described for example.

Moreover, in the following description, a thin film transistor (TFT) may be implemented as a p-type TFT or with an n-type TFT and a p-type TFT. The TFT may be a three-electrode element including a gate, a source, and a drain. The source may be an electrode which provides a carrier to a transistor. In the TFT, a carrier may start to flow from the source. The drain may be an electrode where the carrier flows from the TFT to the outside. That is, in the TFT, the carrier flows from the source to the drain.

In the p-type TFT, because a carrier is a hole, a source voltage may be higher than a drain voltage so that the hole flows from the source to the drain. In the p-type TFT, because the hole flows from the source to the drain, a current may flow from the source to the drain. On the other hand, in the n-type TFT, because a carrier is an electron, a source voltage may be lower than a drain voltage so that the electron flows from the source to the drain. In the n-type TFT, because the electron flows from the drain to the source, a current may flow from the drain to the source. However, a source and a drain of a TFT may switch therebetween based on a voltage applied thereto. Based thereon, in the following description, one of a source and a drain will be described as a first electrode, and the other of the source and the drain will be described as a second electrode.

Figure 1:
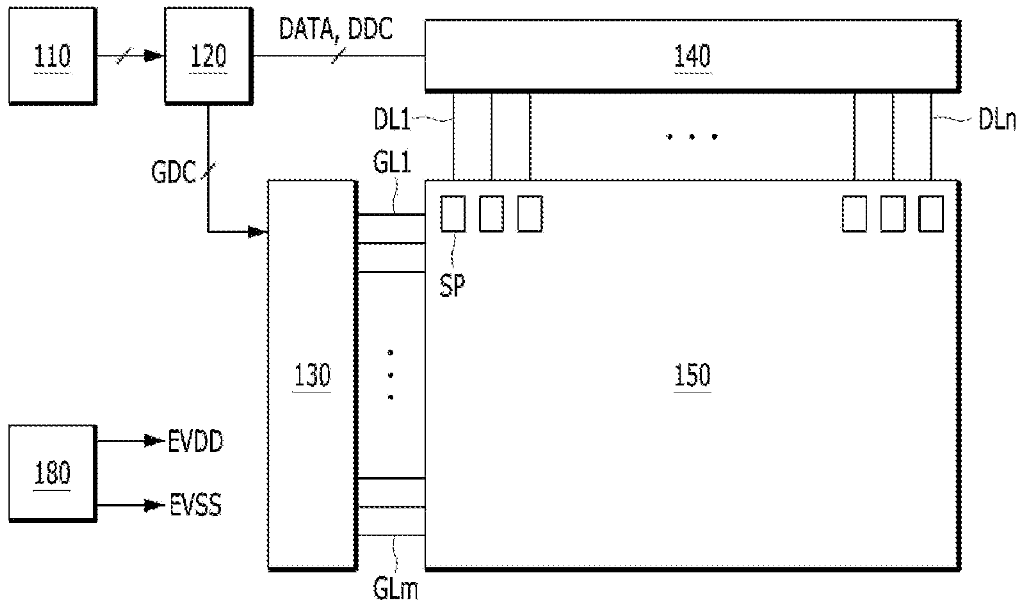
FIG. 1 is a block diagram schematically illustrating a display apparatus according to one embodiment.
Figure 2:
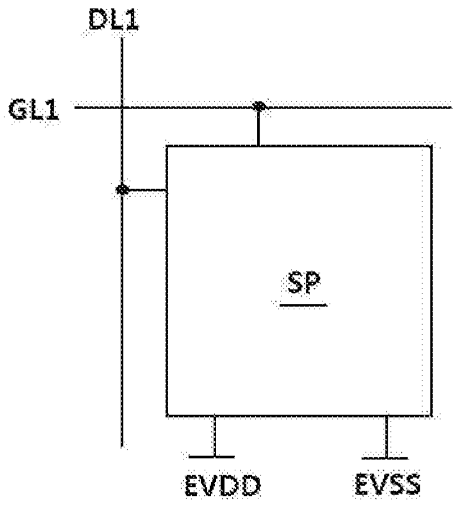
FIG. 2 is a block diagram schematically illustrating a subpixel illustrated in FIG. 1 according to one embodiment.

FIG. 1 is a block diagram schematically illustrating a display apparatus according to one embodiment, and FIG. 2 is a block diagram schematically illustrating a subpixel illustrated in FIG. 1 according to one embodiment.

As illustrated in FIGS. 1 and 2, the display apparatus may include a video supply unit 110, a timing controller 120, a gate driver 130, a data driver 140, a display panel 150, and a power supply 180.

The video supply unit 110 (a set or a host system) may output a video data signal supplied from the outside or a video data signal (an image data signal) stored in an internal memory thereof. The video supply unit 110 may supply a data signal and the various driving signals to the timing controller 120.

The timing controller 120 may output a gate timing control signal GDC for controlling an operation timing of the gate driver 130, a data timing control signal DDC for controlling an operation timing of the data driver 140, and various synchronization signals (for example, a vertical synchronization signal VSYNC, a horizontal synchronization signal HSYNC, etc.). The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The gate driver 130 may output a gate signal (or a gate voltage) in response to the gate timing control signal GDC supplied from the timing controller 120. The gate driver 130 may supply the gate signal to a plurality of subpixels, included in the display panel 150, through a plurality of gate lines GL1 to GLm. The gate driver 130 may be implemented as an IC type or may be directly provided on the display panel 150 in a gate in panel (GIP) type, but is not limited thereto.

In response to the data timing control signal DDC supplied from the timing controller 120, the data driver 140 may sample and latch the data signal DATA, convert a digital data signal into an analog data voltage on the basis of a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate a high-level voltage and a low-level voltage on the basis of an external input voltage supplied from the outside and may output the high-level voltage and the low-level voltage through a first power line EVDD and a second power line EVSS. The power supply unit 180 may generate and output a voltage (a gate voltage including a gate high voltage and a gate low voltage) needed for driving of the gate driver 130 or a voltage (a drain voltage including a half drain voltage and a drain voltage) needed for driving of the data driver 140, in addition to the high-level voltage and the low-level voltage.

The display panel 150 may display an image on the basis of a driving signal including the gate signal and a data voltage and a driving voltage including the high-level voltage and the low-level voltage. The subpixels of the display panel 150 may each self-emit light. The display panel 150 may be manufactured based on a substrate, having stiffness or flexibility, such as glass, silicon, or polyimide. Also, the subpixels emitting light may include pixels including red, green, and blue, or may include pixels including red, green, blue, and white.

For example, one subpixel SP may be connected to a first data line DL1, a first gate line GL1, the first power line EVDD, and the second power line EVSS and may include a pixel circuit which includes a switching transistor, a driving transistor, a capacitor, and an organic light emitting diode. The subpixel SP applied to the light emitting display apparatus may self-emit light, and thus, may be complicated in circuit configuration. Also, the subpixel SP may further include various circuits such as a compensation circuit which compensates for a degradation in the organic light emitting diode emitting light and a degradation in the driving transistor supplying a driving current to the organic light emitting diode. Accordingly, it may be assumed that the subpixel SP is simply illustrated in a block form.

Hereinabove, each of the timing controller 120, the gate driver 130, and the data driver 140 has been described as an individual element. However, based on an implementation type of the light emitting display apparatus, one or more of the timing controller 120, the gate driver 130, and the data driver 140 may be integrated into one IC.

Figure 3:
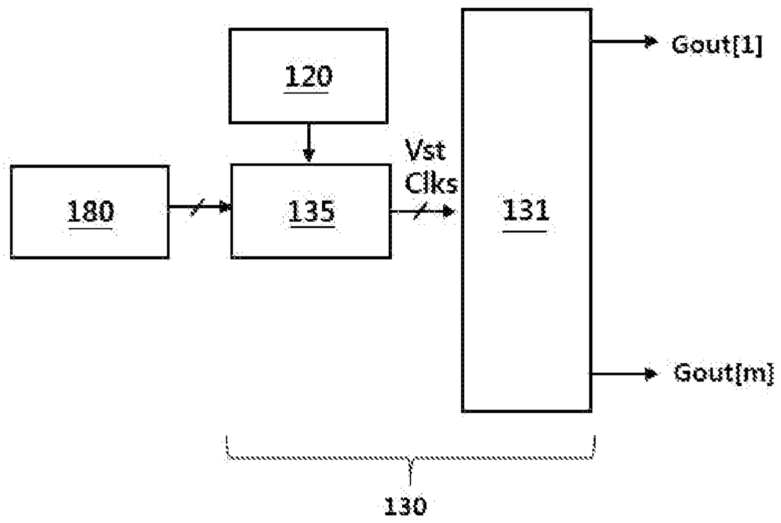
FIGS. 3 and 4 are diagrams for describing a configuration of a gate in panel (GIP)-type gate driver according to one embodiment.
Figure 4:
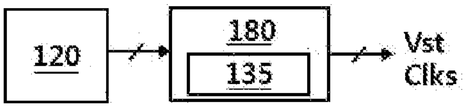
Figure 5:
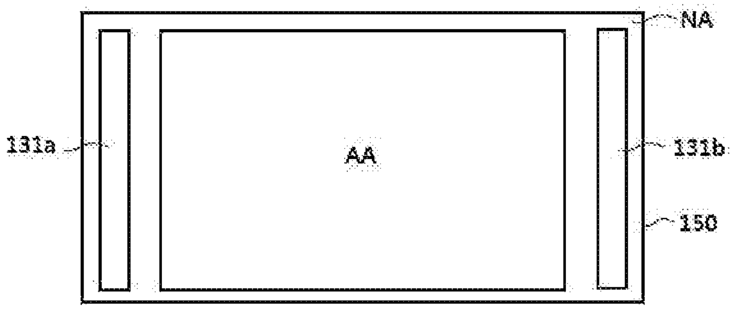
FIG. 5 is a diagram illustrating an arrangement example of the GIP-type gate driver according to one embodiment.

FIGS. 3 and 4 are diagrams for describing a configuration of a GIP-type gate driver 130 according to one embodiment, and FIG. 5 is a diagram illustrating an arrangement example of the GIP-type gate driver 130 according to one embodiment.

As illustrated in FIG. 3, the GIP-type gate driver 130 may include a shift register 131 and a level shifter 135. The level shifter 135 may generate clock signals Clks and a start signal Vst, based on signals and voltages output from the timing controller 120 and the power supply 180. The shift register 131 may operate based on the clock signals Clks and the start signal Vst output from the level shifter 135 and may output gate signals Gout[1] to Gout[m].

As illustrated in FIGS. 3 and 4, the level shifter 135 may be independently provided as an IC type unlike the shift register 131, or may be included in the power supply 180. However, this may be merely an embodiment, and embodiments of the present disclosure are not limited thereto.

As illustrated in FIG. 5, first and second shift registers **131*a* and 131*b* which output gate signals in the GIP-type gate driver may be disposed in a non-display area NA of the display panel 150. The first and second shift registers 131*a* and 131*b* may be implemented as a thin film type in the display panel 150, based on the GIP type. An example is illustrated where the first and second shift registers 131*a* and 131*b* are respectively disposed in a left non-display area NA and a right non-display area NA of the display panel 150**, but embodiments of the present disclosure are not limited thereto.

Figure 6:
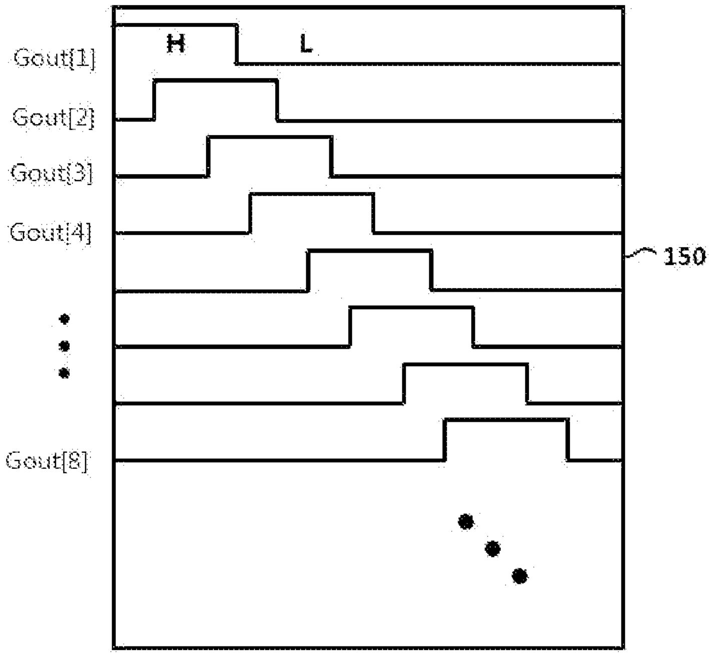
FIG. 6 is a block diagram illustrating output types of gate signals in first mode driving of a display apparatus according to a first embodiment of the present disclosure.
Figure 7:
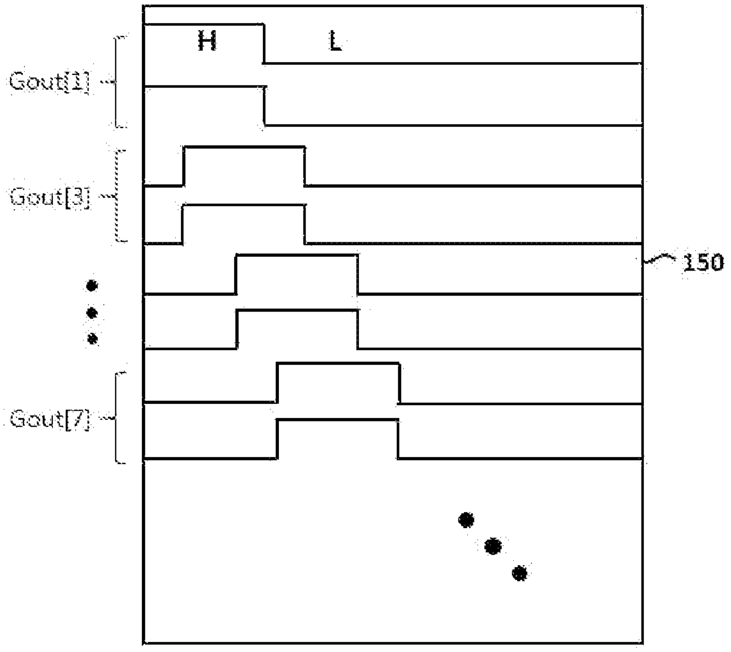
FIG. 7 is a block diagram illustrating output types of gate signals in second mode driving of the display apparatus according to the first embodiment of the present disclosure.
Figure 8:
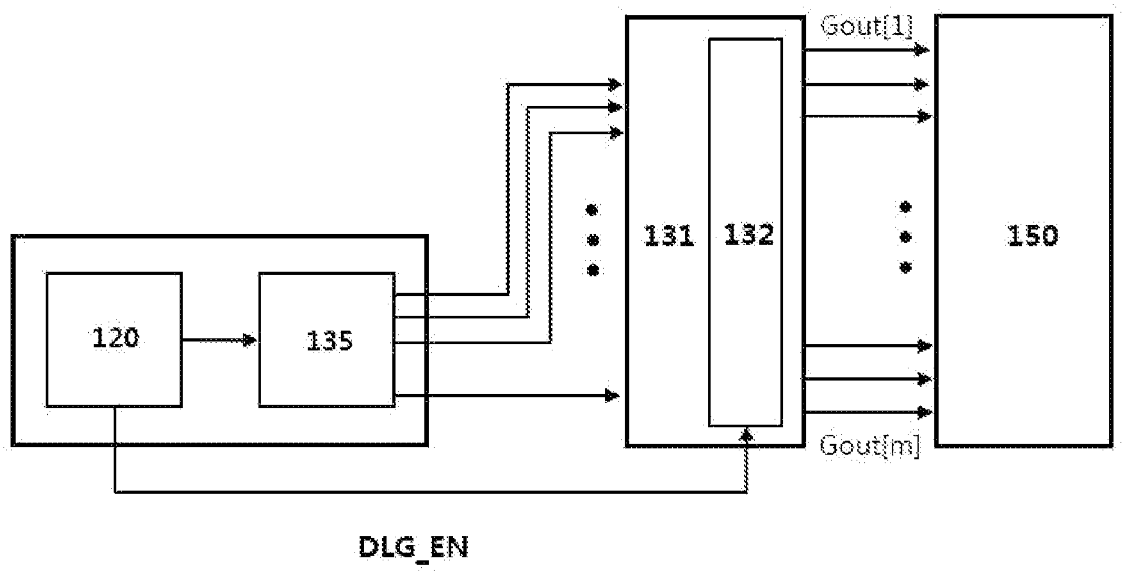
FIG. 8 is a main configuration diagram of the display apparatus according to the first embodiment of the present disclosure.
Figure 9:
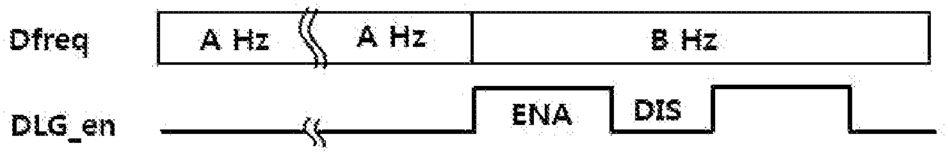
FIG. 9 is a waveform diagram for describing an output change signal applied to an output change circuit unit illustrated in FIG. 8 according to one embodiment.

FIG. 6 is a block diagram illustrating output types of gate signals in first mode driving of a display apparatus according to a first embodiment of the present disclosure, FIG. 7 is a block diagram illustrating output types of gate signals in second mode driving of the display apparatus according to the first embodiment of the present disclosure, FIG. 8 is a main configuration diagram of the display apparatus according to the first embodiment of the present disclosure, and FIG. 9 is a waveform diagram for describing an output change signal applied to an output change circuit unit illustrated in FIG. 8 according to one embodiment.

As illustrated in FIG. 6, the display apparatus according to the first embodiment of the present disclosure may sequentially divide and output gate signals Gout[1] to Gout[8] which are to be supplied to the display panel 150, and in this case, may output one gate signal per one gate line. Accordingly, a first gate signal Gout[1] may be output through a first gate line and then a second gate signal Gout[2] may be output through a second gate line so that a partial period thereof overlaps the first gate signal Gout[1].

As illustrated in FIG. 7, the display apparatus according to the first embodiment of the present disclosure may sequentially divide and output the gate signals Gout[1] to Gout[8] which are to be supplied to the display panel 150, in driving in a second mode, and in this case, may output one gate signal per two gate lines. Accordingly, the first gate signal Gout[1] may be output through the first gate line and the second gate line and then a third gate signal Gout[3] may be output through a third gate line and a fourth gate line so that a partial period thereof overlaps the first gate signal Gout[1]. That is, two gate lines vertically adjacent to each other may transfer one gate signal which is identically generated.

Furthermore, in FIGS. 6 and 7, it has been described that an operation of outputting a gate signal having a high voltage H denotes an operation of outputting a signal and an operation of outputting a gate signal having a low voltage L denotes an operation where a signal is not output. However, an example may be described where a transistor included in a subpixel of the display panel 150 is turned on by the high voltage H. That is, in a case where the transistor included in the subpixel of the display panel 150 is turned off by the low voltage L, it may be described that a gate signal is output when having a phase opposite to an illustrated phase.

As illustrated in FIG. 8, the display apparatus according to the first embodiment of the present disclosure may include the timing controller 120, the level shifter 135, the shift register 131, an output change circuit unit 132, and the display panel 150.

The timing controller 120 may output first clock signals needed for an operation of the level shifter 135. The level shifter 135 may output second clock signals needed for an operation of the shift register 131, based on the first clock signals. The timing controller 120 may output an output change signal through an output change signal line DLG_EN.

The output change circuit unit 132 (e.g., a circuit) may be included in the shift register 131. The output change circuit unit 132 may change output types of gate signals Gout[1] to Gout[m] output from the shift register 131, based on a logic state of the output change signal output from the timing controller 120. For example, the output change circuit unit 132 may change the output types of gate signals Gout[1] to Gout[m] to a type illustrated in FIG. 6 or 7.

As illustrated in FIGS. 8 and 9, an output change signal DLG_en may be generated in a high logic state or a low logic state. In the output change signal DLG_en, the high logic state may be defined as an activation signal ENA which activates an operation of the output change circuit unit 132, and the low logic state may be defined as a deactivation signal DIS which deactivates an operation of the output change circuit unit 132.

The output change signal DLG_en may be generated as an activation signal ENA type or a deactivation signal DIS type, based on driving frequency Dfreq information about the display apparatus or resolution information about the display panel. For example, in a case where the driving frequency Dfreq of the display apparatus is A Hz, when the output change signal DLG_en is generated as the deactivation signal DIS type and then is changed to B Hz, the output change signal DLG_en may be generated as the activation signal ENA type. In this case, a relationship between A Hz and B Hz is A Hz (relative low frequency or low-speed driving)<B Hz (relative high frequency or high-speed driving), but is not limited thereto. Furthermore, even when the driving frequency Dfreq of the display apparatus is B Hz, depending on the case, the output change signal DLG_en may be temporarily generated as the deactivation signal DIS type. Hereinafter, an example thereof will be described.

Figure 10:
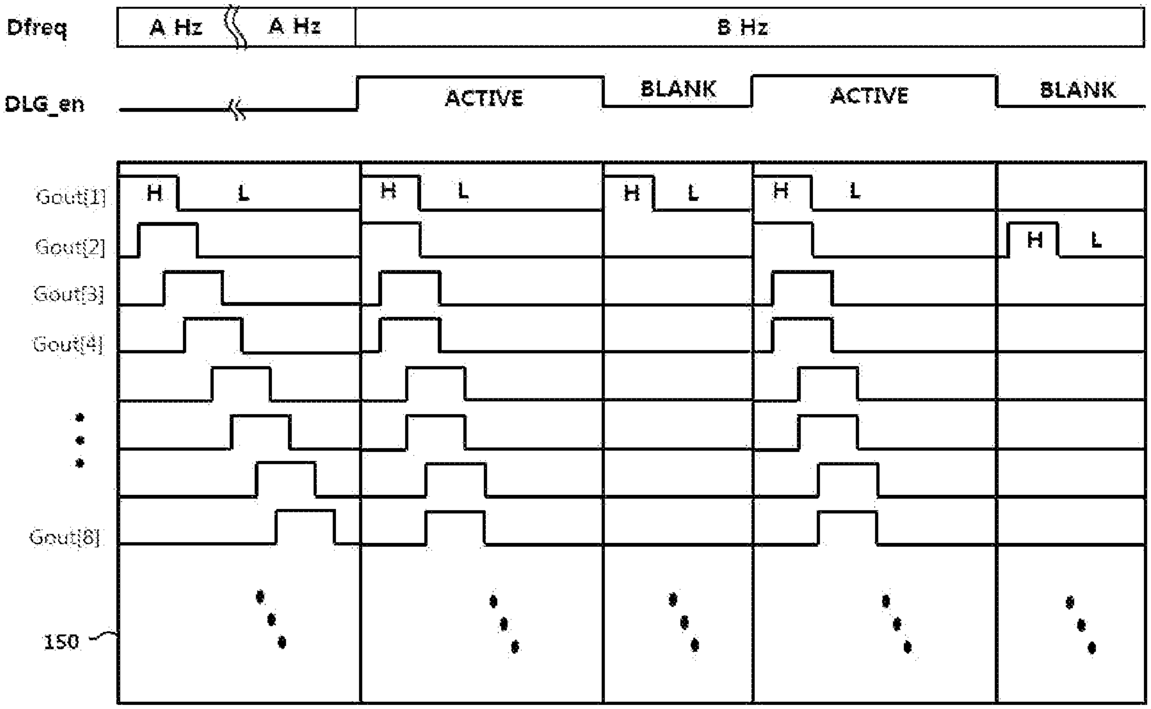
FIG. 10 is an exemplary diagram for describing an output change circuit unit according to the first embodiment of the present disclosure.
Figure 11:
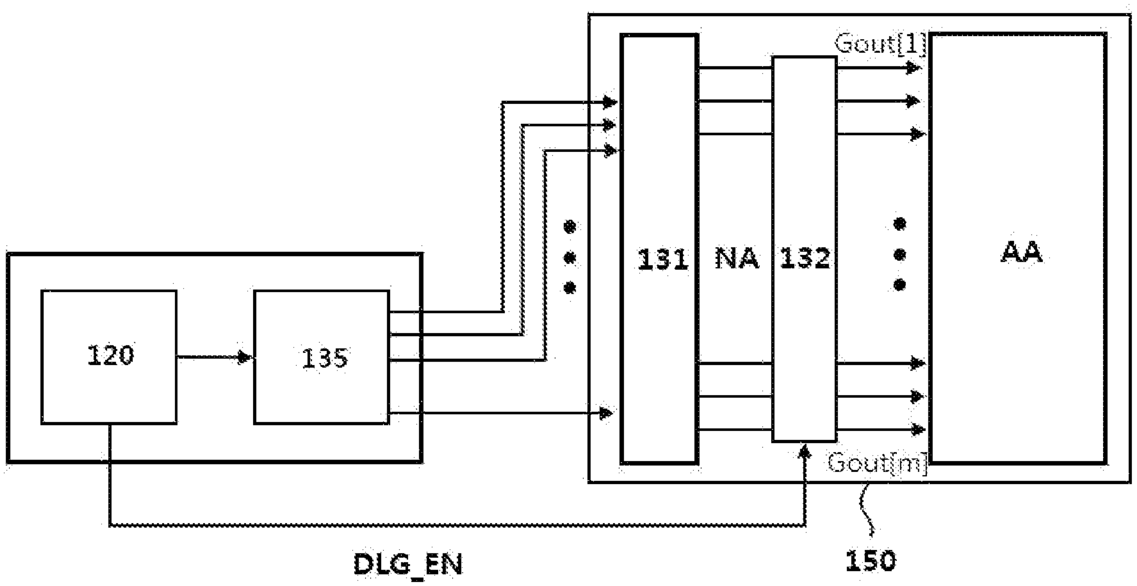
FIGS. 11 and 12 are arrangement diagrams of an output change circuit unit according to a modification embodiment of the first embodiment of the present disclosure.
Figure 12:
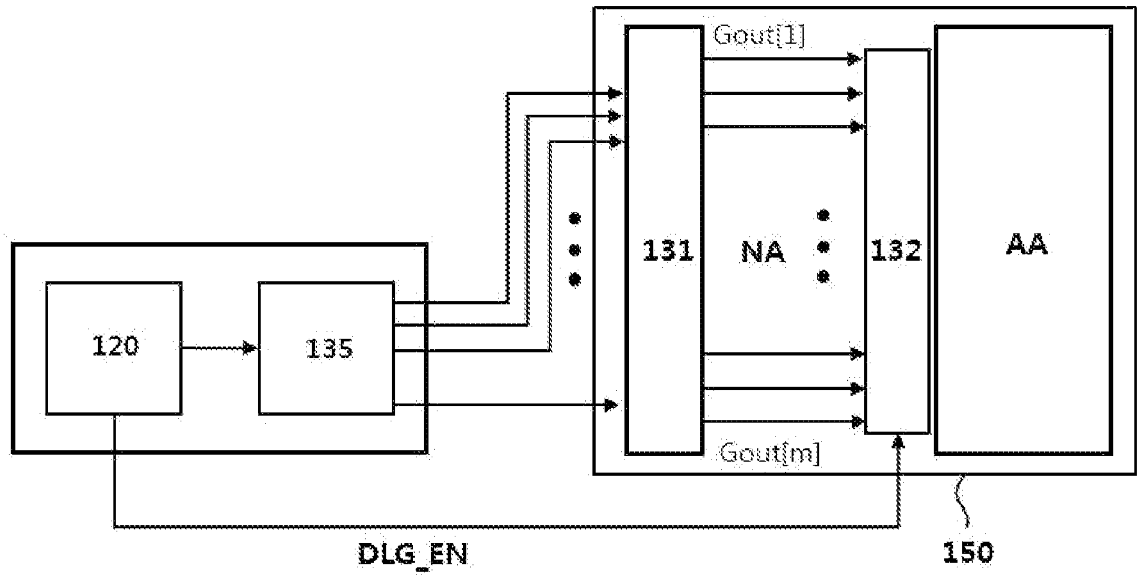
Figure 13:
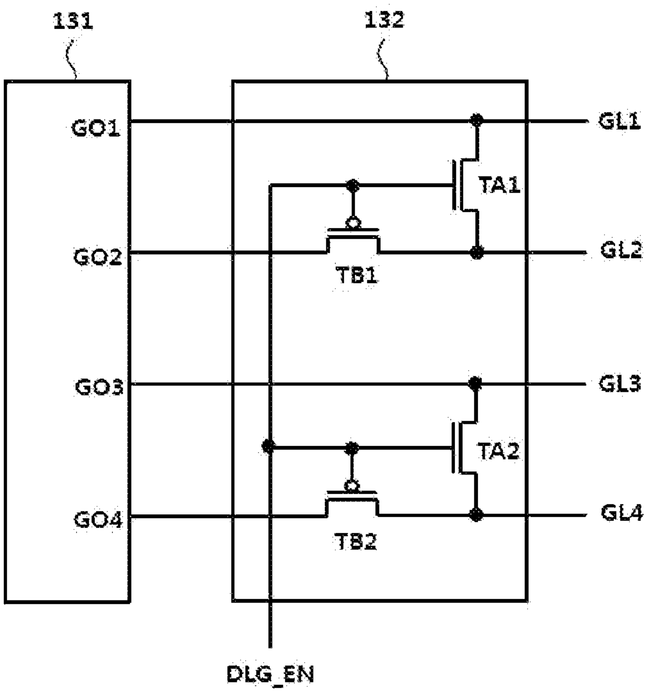
FIG. 13 is a detailed configuration diagram of the output change circuit unit according to one embodiment.
Figure 14:
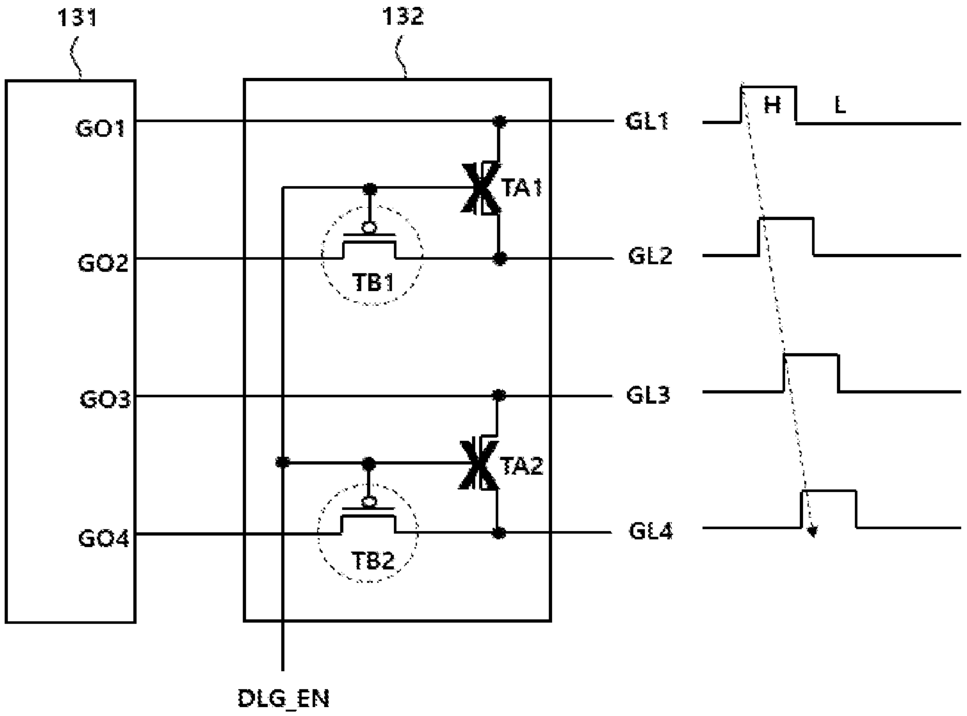
FIGS. 14 and 15 are diagrams for describing an operation of the output change circuit unit according to one embodiment.
Figure 15:
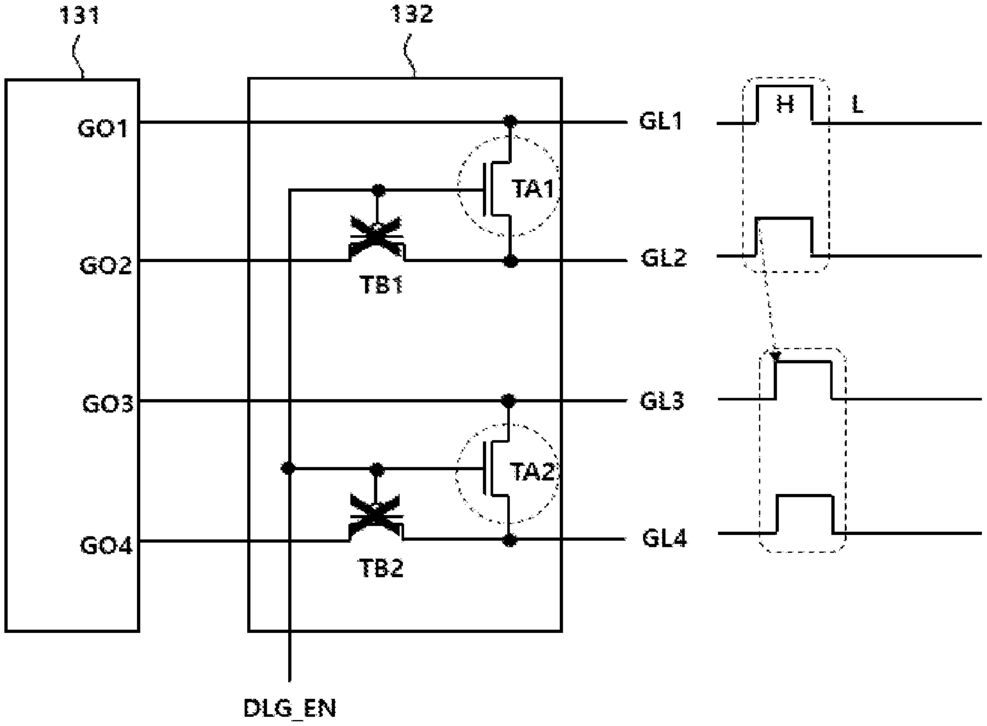
Figure 16:
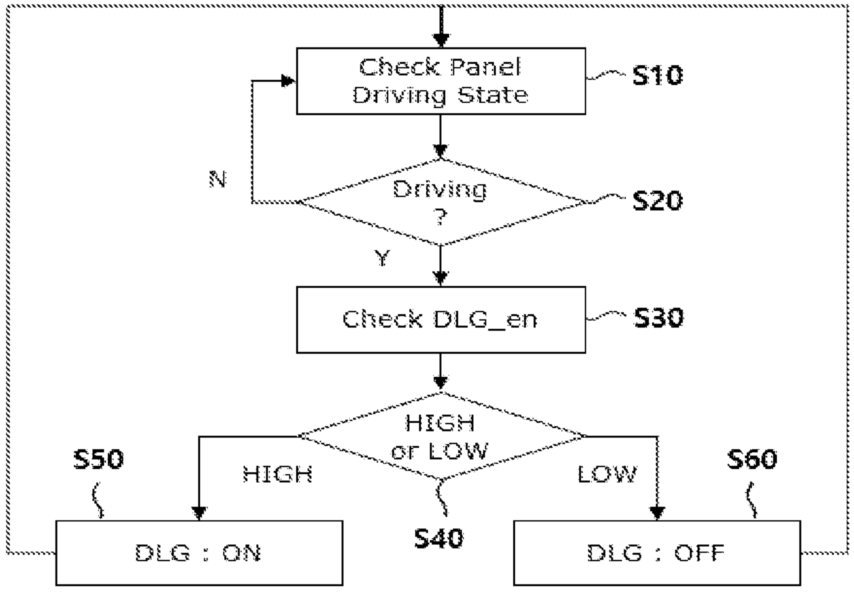
FIG. 16 is a flowchart for describing an operation of the output change circuit unit based on a driving state of a display panel according to one embodiment.

FIG. 10 is an exemplary diagram for describing an output change circuit unit according to the first embodiment of the present disclosure, FIGS. 11 and 12 are arrangement diagrams of an output change circuit unit according to a modification embodiment of the first embodiment of the present disclosure, FIG. 13 is a detailed configuration diagram of the output change circuit unit according to one embodiment, FIGS. 14 and 15 are diagrams for describing an operation of the output change circuit unit according to one embodiment, and FIG. 16 is a flowchart for describing an operation of the output change circuit unit based on a driving state of a display panel according to one embodiment.

As illustrated in FIGS. 8 and 10, an output change signal DLG_en may be generated as high logic during an active period ACTIVE where a display panel displays an image and may be generated as low logic during a blank period BLANK where the display panel does not display an image.

In a case where a driving frequency Dfreq of a display apparatus is A Hz, the output change signal DLG_en may be generated as low logic regardless of the active period and the blank period. In this case, because an output change circuit unit 132 is in a deactivation state, gate signals Gout[1] to Gout[8] which are to be supplied to a display panel 150 may be sequentially divided and output, and in this case, one gate signal per one gate line may be output.

In a case where the driving frequency Dfreq of the display apparatus is B Hz, the output change signal DLG_en may be generated as high logic, based on the active period ACTIVE. In this case, because the output change circuit unit 132 is in an activation state, the gate signals Gout[1] to Gout[8] which are to be supplied to the display panel 150 may be sequentially divided and output, and in this case, one gate signal per two gate lines may be output.

In a case where the driving frequency Dfreq of the display apparatus is B Hz, the output change signal DLG_en may be generated as low logic, based on the blank period BLANK. In this case, although the output change circuit unit 132 is in a deactivation state, only a gate signal which is to be supplied to a selected gate line may be output to the display panel 150. In FIG. 10, an example has been described where a first gate signal Gout[1] is output in a first blank period BLANK and a second gate signal Gout[2] is output in a second blank period BLANK, but one or more gate signals may be output at various positions.

As illustrated in FIG. 11, the output change circuit unit 132 may be disposed in a non-display area NA of the display panel 150 and may be disposed between a shift register 131 and a display area AA. Also, as illustrated in FIG. 12, the output change circuit unit 132 may be disposed in the non-display area NA of the display panel 150 and may be disposed adjacent to the display area AA. Furthermore, in FIGS. 8, 11, and 12, an example is described where the timing controller 120 and the level shifter 135 are mounted on the same substrate in an IC type, but embodiments of the present disclosure are not limited thereto.

The reason that the output change circuit unit 132 is disposed as in FIGS. 8, 11, and 12 may be because circuits configuring the output change circuit unit 132 are formed by the same thin film process as elements included in the display panel 150. Hereinafter, elements configuring the output change circuit unit 132 will be described.

As illustrated in FIG. 13, the output change circuit unit 132 may include $A^{th}$ transistors TA1 and TA2 and $B^{th}$ transistors TB1 and TB2. The $A^{th}$ transistors TA1 and TA2 may be selected as an n type, and $B^{th}$ transistors TB1 and TB2 may be selected as a p type. In the $A^{th}$ transistors TA1 and TA2 and the $B^{th}$ transistors TB1 and TB2, gate electrodes (control electrodes) may be connected with an output change signal line DLG_EN in common. A connection relationship thereof will be described below with respect to a $1A^{th}$ transistor TA1 and a $1B^{th}$ transistor TB1.

A gate electrode of the $1A^{th}$ transistor TA1 may be connected with the output change signal line DLG_EN, a first electrode thereof may be connected with a first output terminal GO1 of the shift register 131 and a first gate line GL1, and a second electrode thereof may be connected with a second output terminal GO2 of the shift register 131 and a second gate line GL2. A gate electrode of the $1B^{th}$ transistor TB1 may be connected with the output change signal line DLG_EN, a first electrode thereof may be connected with the second output terminal GO2 of the shift register 131, and a second electrode thereof may be connected with the second gate line GL2. A gate electrode of the $2A^{th}$ transistor TA2 may be connected with the output change signal line DLG_EN, a first electrode thereof may be connected with a third output terminal GO3 of the shift register 131 and a third gate line GL3, and a second electrode thereof may be connected with a fourth output terminal GO4 of the shift register 131 and a fourth gate line GL4. A gate electrode of the $2B^{th}$ transistor TB2 may be connected with the output change signal line DLG_EN, a first electrode thereof may be connected with the fourth output terminal GO4 of the shift register 131, and a second electrode thereof may be connected with the fourth gate line GL4.

The $A^{th}$ transistors TA1 and TA2 and the $B^{th}$ transistors TB1 and TB2 may operate as follows, based on a logic state of an output change signal supplied through the output change signal line DLG_EN. The $A^{th}$ transistors TA1 and TA2 may operate to connect two gate lines adjacent to each other with each other. Also, the $B^{th}$ transistors TB1 and TB2 may operate to mask (non-output) a gate signal output through one gate line (an odd gate line or an even gate line) selected from among two gate lines adjacent to each other.

As illustrated in FIG. 14, when the output change signal is in a low state, the $B^{th}$ transistors TB1 and TB2 may have a turn-on state, but the $A^{th}$ transistors TA1 and TA2 may have a turn-off state. In this case, gate signals may be output to first to fourth gate lines GL1 to GL4 in a type illustrated in FIG. 6.

As illustrated in FIG. 15, when the output change signal is in a high state, the $B^{th}$ transistors TB1 and TB2 may have a turn-off state, but the $A^{th}$ transistors TA1 and TA2 may have a turn-on state. In this case, gate signals may be output to the first to fourth gate lines GL1 to GL4 in a type illustrated in FIG. 7.

As illustrated in FIGS. 8 and 16, the timing controller 120 may check a driving state of the display panel 150 (S10) and may check whether driving for displaying an image is being performed (S20). When driving for normally displaying an image is being performed (Y), the timing controller 120 may check the output change signal DLG_en (S30) and may output high logic HIGH or low logic LOW (S40).

However, when driving for normally displaying an image is not being performed (N), the timing controller 120 may check a driving state again (S10). Here, a case where driving for normally displaying an image is not being performed may include a sensing operation and a compensation operation of the display panel 150.

When the output change signal DLG_en having high logic HIGH is output from the timing controller 120, the output change circuit unit 132 may be in an activation state DLG: ON and may perform an output change operation (S50). On the other hand, when the output change signal DLG_en having low logic LOW is output from the timing controller 120, the output change circuit unit 132 may be in a deactivation state DLG:OFF and may not perform an output change operation (S60).

Figure 17:
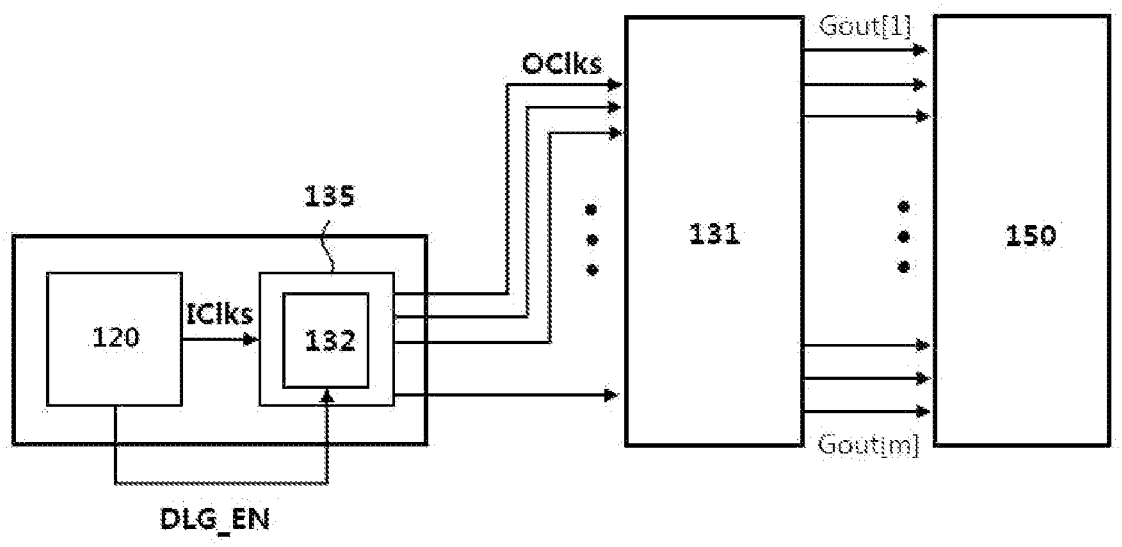
FIG. 17 is a main configuration diagram of a display apparatus according to a second embodiment of the present disclosure.
Figure 18:
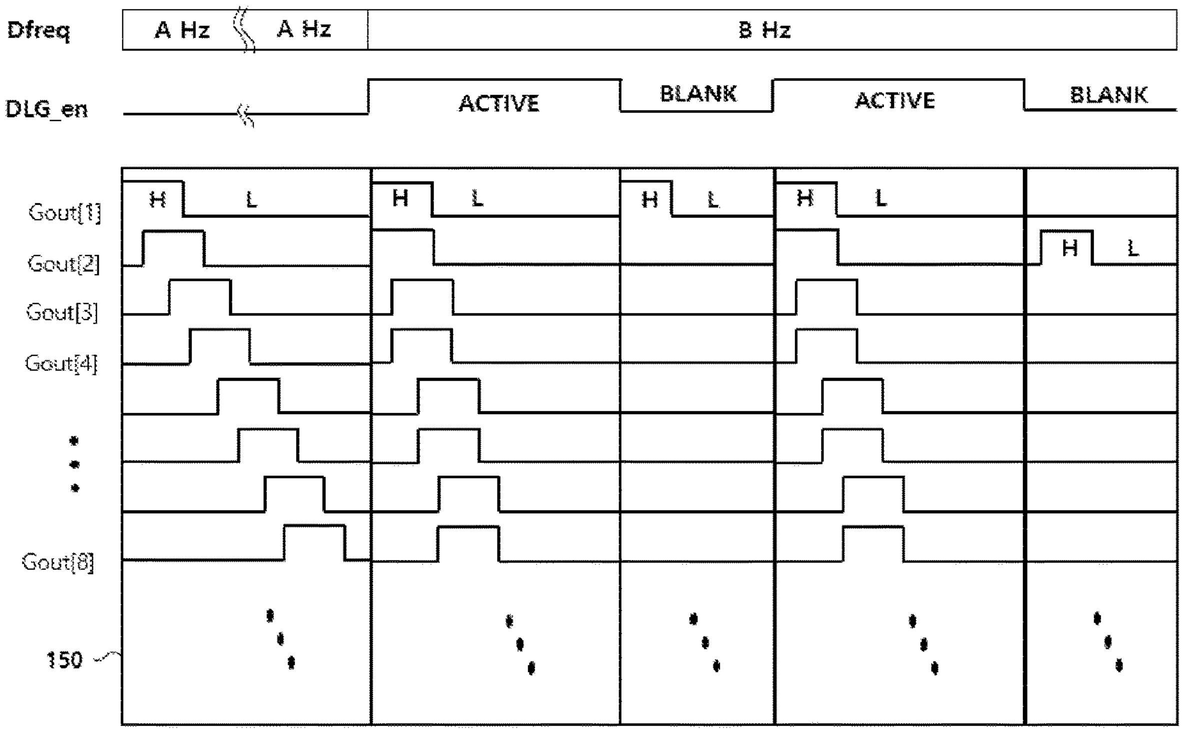
FIG. 18 is an exemplary diagram for describing an output change circuit unit according to the second embodiment of the present disclosure.
Figure 19:
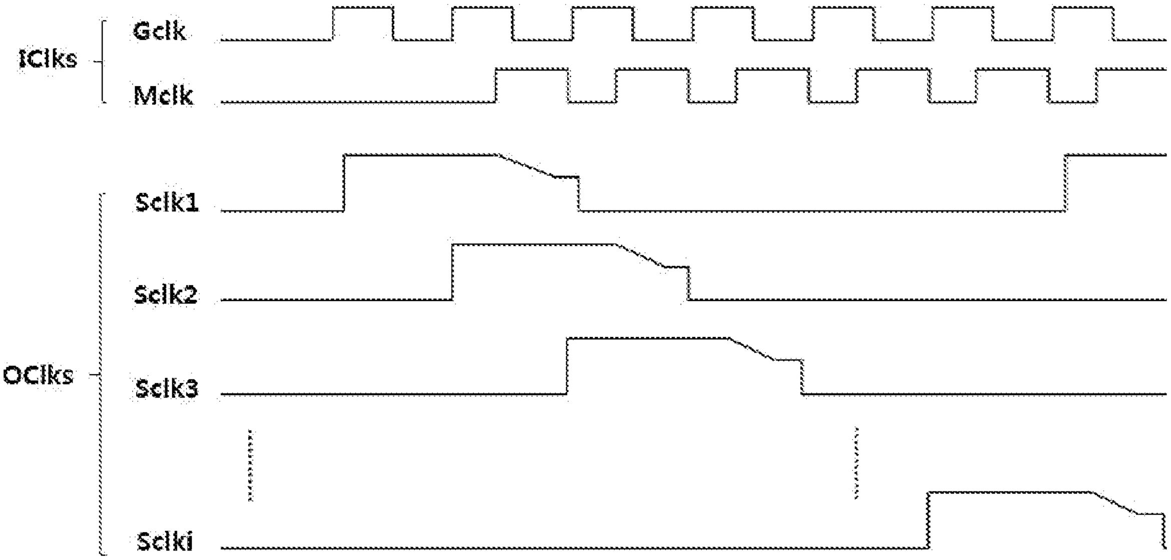
FIGS. 19 and 20 are diagrams for describing an operation of the output change circuit unit according to one embodiment.
Figure 20:
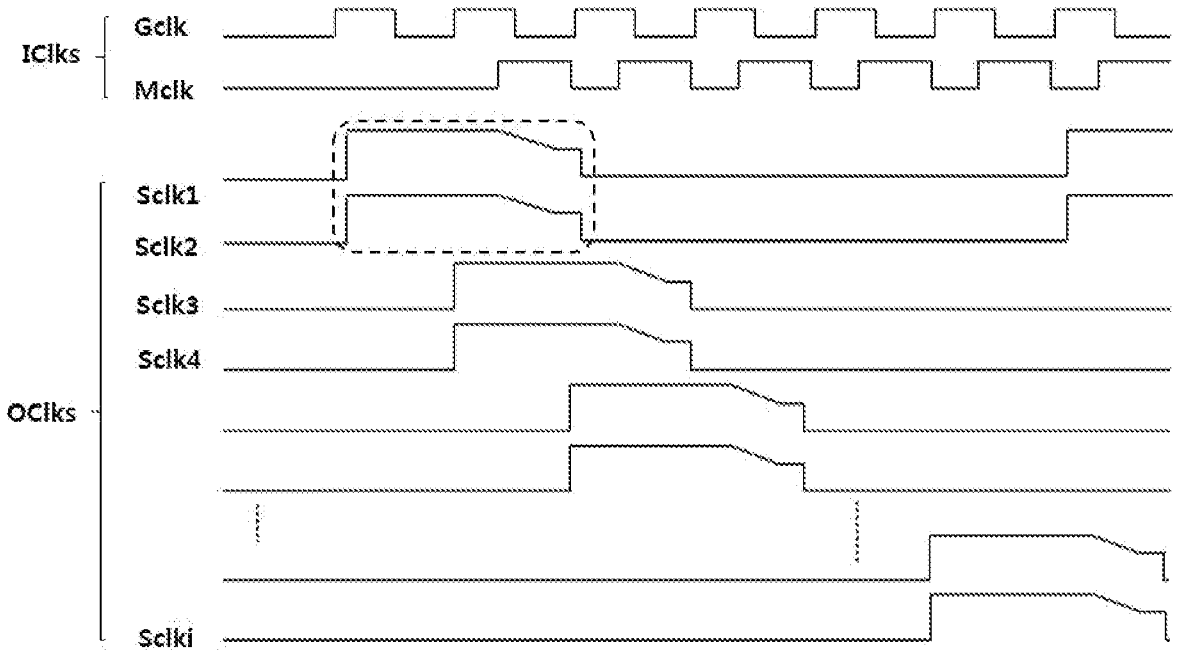

FIG. 17 is a main configuration diagram of a display apparatus according to a second embodiment of the present disclosure, FIG. 18 is an exemplary diagram for describing an output change circuit unit according to the second embodiment of the present disclosure, and FIGS. 19 and 20 are diagrams for describing an operation of the output change circuit unit according to one embodiment.

As illustrated in FIG. 17, the display apparatus according to the second embodiment of the present disclosure may include a timing controller 120, a level shifter 135, a shift register 131, an output change circuit unit 132, and a display panel 150.

The timing controller 120 may output first clock signals needed for an operation of the level shifter 135. The level shifter 135 may output second clock signals needed for an operation of the shift register 131, based on the first clock signals. The timing controller 120 may output an output change signal through an output change signal line DLG_EN.

The output change circuit unit 132 may be included in the shift register 131. The output change circuit unit 132 may change output types of the second clock signals output from the shift register 131, based on a logic state of the output change signal output from the timing controller 120. A change in output types of the second clock signals output from the shift register 131 will be described below.

As illustrated in FIGS. 17 and 18, an output change signal DLG_en may be generated as high logic during an active period ACTIVE where a display panel displays an image and may be generated as low logic during a blank period BLANK where the display panel does not display an image.

In a case where a driving frequency Dfreq of a display apparatus is A Hz, the output change signal DLG_en may be generated as low logic regardless of the active period and the blank period. In this case, because the output change circuit unit 132 is in a deactivation state, gate signals Gout[1] to Gout[8] which are to be supplied to a display panel 150 may be sequentially divided and output, and in this case, one gate signal per one gate line may be output.

In a case where the driving frequency Dfreq of the display apparatus is B Hz, the output change signal DLG_en may be generated as high logic, based on the active period ACTIVE. In this case, because the output change circuit unit 132 is in an activation state, the gate signals Gout[1] to Gout[8] which are to be supplied to the display panel 150 may be sequentially divided and output, and in this case, one gate signal per two gate lines may be output.

In a case where the driving frequency Dfreq of the display apparatus is B Hz, the output change signal DLG_en may be generated as low logic, based on the blank period BLANK. In this case, although the output change circuit unit 132 is in a deactivation state, only a gate signal which is to be supplied to a selected gate line may be output to the display panel 150.

As illustrated in FIGS. 17, 19, and 20, the level shifter 135 may be supplied with first clock signals IClks output from the timing controller 120. The first clock signals IClks may include a first driving clock signal Gclk and a second driving clock signal Mclk.

For example, the first driving clock signal Gclk may be generated as a pulse type which has a certain period and is alternately switched between high logic and low logic. Also, the second driving clock signal Mclk may be generated as a pulse type which is alternately switched between high logic and low logic, and a time for which high logic is generated may be longer than a time for which low logic is generated. However, this may be merely an embodiment, but embodiments of the present disclosure are not limited thereto.

The level shifter 135 may output second clock signals OClks needed for an operation of the shift register 131, based on the first clock signals IClks supplied from the timing controller 120. The second clock signals OClks may include first to $i^{th}$ scan clock signal Sclk1 to Sclki (where i may be an integer of 4 or more).

For example, the first scan clock signal Sclk1 may be generated as high logic in synchronization with a first rising edge of the first driving clock signal Gclk and may be generated as low logic in synchronization with a first falling edge of the second driving clock signal Mclk. Also, the second scan clock signal Sclk2 may be generated as high logic in synchronization with a second rising edge of the first driving clock signal Gclk and may be generated as low logic in synchronization with a second falling edge of the second driving clock signal Mclk. However, this may be merely an embodiment, but embodiments of the present disclosure are not limited thereto.

When an output change signal having low logic is output from the timing controller 120, the level shifter 135 may output the second clock signals OClks including the scan clock signals Sclk1 to Sclki which are sequentially generated so that adjacent scan clock signals overlap each other during a certain period as in FIG. 19.

On the other hand, when an output change signal having high logic is output from the timing controller 120, the level shifter 135 may output the second clock signals OClks including the scan clock signals Sclk1 to Sclki which are sequentially generated so that adjacent scan clock signals overlap each other during a certain period as in FIG. 20 and where two adjacent scan clock signals are paired to be simultaneously generated. That is, two scan clock signals vertically adjacent to each other may be paired and generated as the same type.

The level shifter 135 may change output types of the second clock signals OClks, based on a logic state of the output change signal output from the timing controller 120. Also, the shift register 131 may output gate signals Gout[1] to Gout[8] in a type illustrated in FIG. 18, based on a change in output types of the second clock signals OClks.

Figure 21:
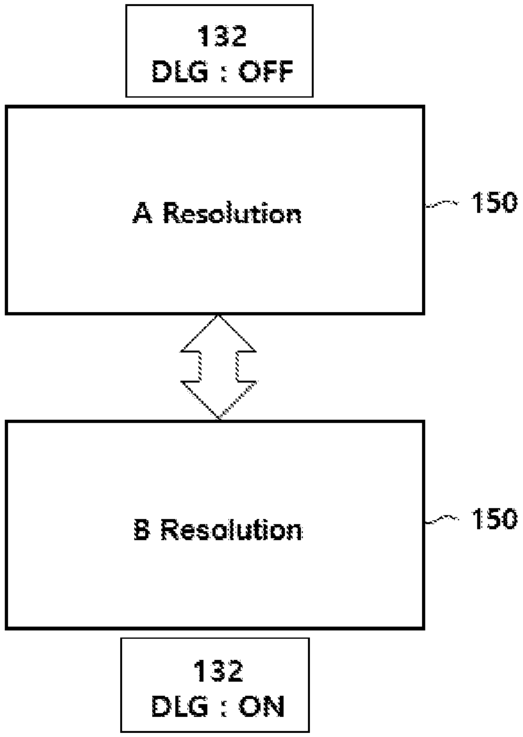
FIGS. 21 and 22 are diagrams for describing an output change circuit unit of a display apparatus according to a third embodiment of the present disclosure.
Figure 22:
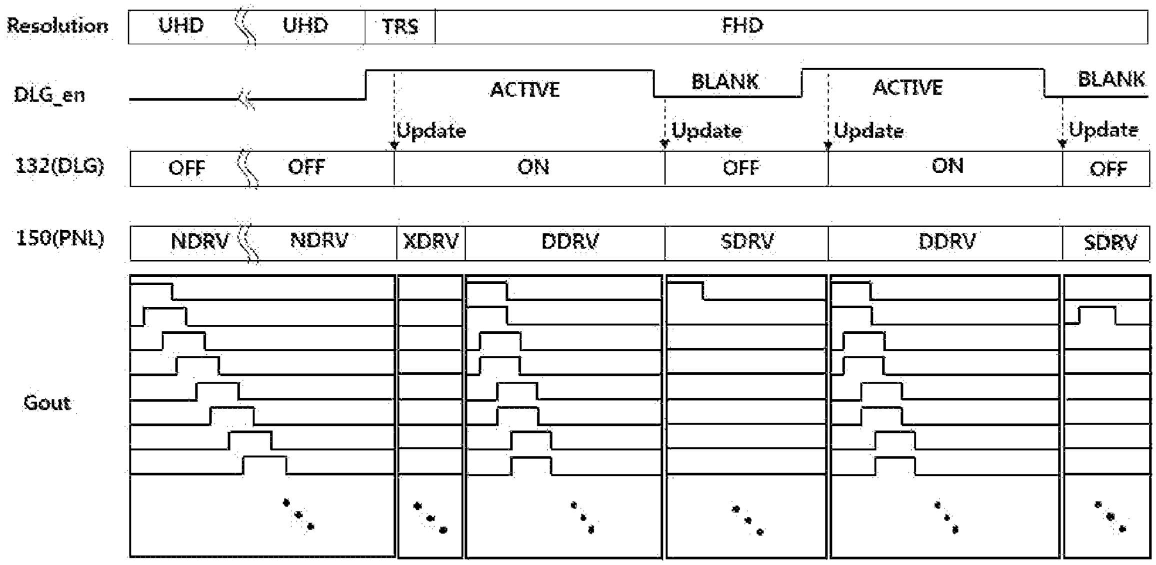
Figure 23:
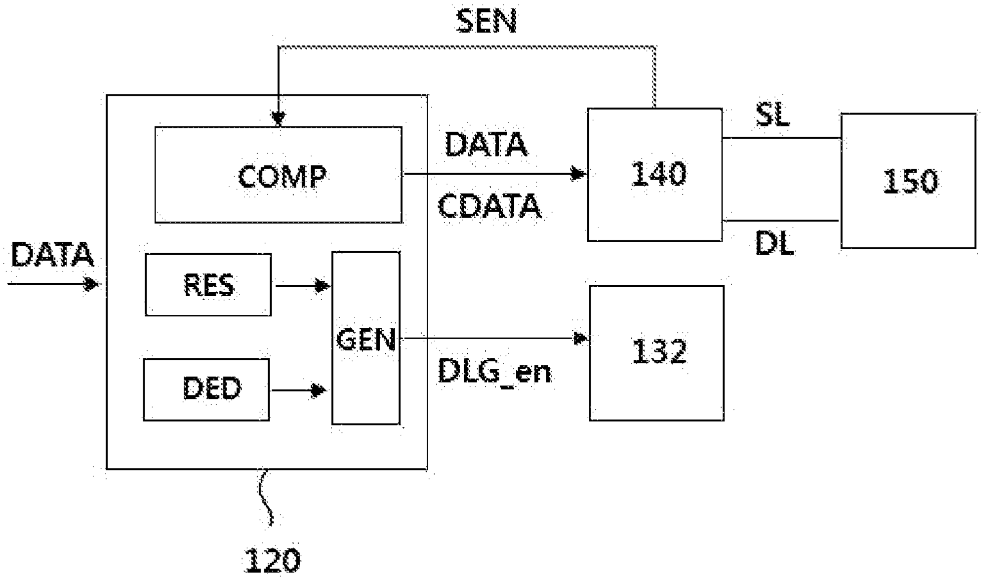
FIG. 23 is a configuration diagram of a display apparatus according to the third embodiment of the present disclosure.

FIGS. 21 and 22 are diagrams for describing an output change circuit unit of a display apparatus according to a third embodiment of the present disclosure, and FIG. 23 is a configuration diagram of a display apparatus according to the third embodiment of the present disclosure.

As illustrated in FIG. 21, the display apparatus according to the third embodiment of the present disclosure may deactivate (DLG:OFF) or activate (DLG:ON) an output change circuit unit 132, based on a resolution displayed on a display panel 150.

For example, when an image having an A resolution is displayed on the display panel 150, the output change circuit unit 132 may be deactivated (DLG:OFF), and when an image having a B resolution is displayed on the display panel 150, the output change circuit unit 132 may be activated (DLG:ON). In this case, a relationship between the A resolution and the B resolution may be "A resolution (relative high resolution)>B resolution (relative low resolution)", but is not limited thereto.

As illustrated in FIG. 22, when an image having an ultra-high definition (UHD) resolution is applied to the display panel 150, an output change signal DLG_en may be generated as low logic, and when an image having a full HD (FHD) resolution is applied to the display panel 150, the output change signal DLG_en may be generated as high logic. Also, even when an image having an FHD resolution is applied to the display panel 150, the output change signal DLG_en may be generated as high logic during an active period ACTIVE of the display panel 150 and may be generated as low logic during a blank period BLANK of the display panel 150.

Furthermore, when a resolution of an image applied to the display panel 150 is changed from UHD to FHD, a resolution change period TRS may be provided therebetween. The resolution change period TRS may be defined as a period for synchronizing (matching) a driving timing of the display panel with a timing at which the output change signal DLG_en is generated. Apparatuses may be synchronized with a changed driving condition in driving of the display apparatus during the resolution change period TRS, and thus, a phenomenon may be prevented where an apparatus operates in an abnormal state (for example, an abnormal screen output) in changing a resolution.

The application of an UHD image may end and the display panel may enter the resolution change period TRS, and simultaneously, the output change signal DLG_en may be generated as high logic. However, the output change signal DLG_en may be applied to an output change circuit unit 130, and there may be a time for updating a driving condition to a new driving condition. Accordingly, a certain delay time may elapse after the output change signal DLG_en is generated, and then, the output change circuit unit 130 may be activated (DLG:ON).

A period where a UHD image is applied to the display panel 150 may be defined as a normal driving period NDRV (or a first mode driving period). Gate signals Gout may be sequentially output during the normal driving period NDRV, and in this case, one gate signal per one gate line may be output to be applied to the display panel 150.

The resolution change period TRS where a resolution of an image applied to the display panel 150 is changed may be defined as a non-driving period XDRV. The gate signals Gout may not be output during the non-driving period XDRV. Furthermore, in FIG. 22, it may be assumed that a certain delay time elapses after the resolution change period TRS is generated (because there is a time taken in controlling a scan driver and a data driver on the basis of a signal output from a timing controller), and then, the non-driving period XDRV occurs.

In a period where an FHD image is applied to the display panel 150, an active period ACTIVE may be defined as a double driving period DDRV (or a second mode driving period). The gate signals Gout may be sequentially output during the double driving period DDRV, and in this case, one gate signal per two gate lines may be output to be applied to the display panel 150.

In a period where an FHD image is applied to the display panel 150, a blank period BLANK may be defined as a sensing driving period SDRV (or a third mode driving period). Only a gate signal, which is to be supplied to a selected gate line, of the gate signals Gout may be output during the sensing driving period SDRV.

As illustrated in FIGS. 22 and 23, the timing controller 120 may include a resolution detector RES (e.g., a circuit), a signal detector DED (e.g., a circuit), a signal generator GEN (e.g., a circuit), and a compensator COMP (e.g., a circuit). The resolution detector RES and the signal detector DED may detect resolution information and a data enable signal (including frequency information), which activates an output of a data signal, in a data signal DATA input to the timing controller 120. The signal generator GEN may generate the output change signal DLG_en, based on the resolution information and the data enable signal, and may supply the output change signal DLG_en to the output change circuit unit 130.

The data driver 140 may drive the display panel 150, based on the data signal DATA supplied from the timing controller 120. The data driver 140 may supply data voltages to subpixels through data lines DL of the display panel 150 during the normal driving period NDRV or the double driving period DDRV.

The data driver 140 may sense a characteristic (a threshold voltage, mobility, etc.) of element(s) included in subpixels through a sensing line SL of the display panel 150 during the sensing driving period SDRV. The data driver 140 may convert a sensing value SEN, corresponding to a characteristic of an element obtained through the sensing line SL, into a digital signal and may supply a digital sensing value SEN to the timing controller 140.

The compensator COMP may determine whether a characteristic of an element is degraded or not, based on the sensing value SEN supplied to the timing controller 140, and may generate a compensation data signal CDATA for compensating for the degradation. The compensator COMP may generate the compensation data signal CDATA, based on a variation of a threshold voltage of a driving transistor or an organic light emitting diode included in subpixels. Furthermore, the compensator COMP may update and store information, associated with compensation, such as a compensation value and a position of an element(s) which is degraded, based on a memory.

As described above, the present disclosure may change a driving mode of a display panel on the basis of a resolution or a driving frequency of an image applied to a display apparatus. Also, the present disclosure may integrate platforms of circuits in implementing an apparatus for increasing or decreasing a driving scan rate of the display apparatus, thereby increasing general purpose. Also, the present disclosure may provide a general-purpose change circuit for changing a driving scan rate in a method requiring the sensing and compensation of a display panel or a method having no requirement.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel configured to display an image;

a gate driver configured to supply gate signals to the display panel;

a data driver connected with the display panel; and a timing controller configured to control the gate driver, wherein the gate driver comprises:

a shift register configured to output the gate signals;

a level shifter configured to output scan clock signals that drive the shift register; and an output change circuit configured to control an output of the shift register or the level shifter based on an output change signal provided from the timing controller, wherein the timing controller is configured to:

when a driving frequency of the display apparatus is a first frequency, generate the output change signal as a first logic that deactivates the output change circuit in order to apply one gate signal of the gate signals per one gate line, and when the driving frequency is a second frequency smaller than the first frequency, generate the output change signal as a second logic that activates the output change circuit in order to apply the one gate signal per at least two gate lines during an active period where an image is displayed and generate the output change signal as the first logic in order to apply the one gate signal of the gate signals per one gate line during a blank period where an image is not displayed.

2. The display apparatus of claim 1, wherein the output change circuit is activated or deactivated based on control by the timing controller to control the gate signals output from the shift register or control the scan clock signals output from the level shifter.

3. The display apparatus of claim 1, wherein during a resolution change period of the display panel during which an apparatus is operated under a changed driving condition when a resolution is changed by the image applied from an external device, the gate signals are not output during the resolution change period.

4. The display apparatus of claim 1, wherein the output change circuit comprises:

a first-type transistor including a gate electrode connected with an output change signal line through which the output change signal is transferred, a first electrode connected with a first output terminal of the shift register included in the gate driver and a first gate line, and a second electrode connected with a second output terminal of the shift register and a second gate line; and a second-type transistor including a gate electrode connected with the output change signal line, a first electrode connected with the second output terminal of the shift register, and a second electrode connected with the second gate line, and the first-type transistor differs from the second-type transistor.

* * * * *